United States Patent [19]

Eggert et al.

[11] 4,019,627
[45] Apr. 26, 1977

[54] TURNTABLE

[75] Inventors: Glenn J. Eggert, Cedarburg; Phillip L. Lee, Greenfield, both of Wis.

[73] Assignee: Rexnord Inc., Milwaukee, Wis.

[22] Filed: Sept. 12, 1975

[21] Appl. No.: 612,972

[52] U.S. Cl. .............................. 198/786; 198/415; 198/787

[51] Int. Cl.² ........................................ B65G 13/02

[58] Field of Search .............. 198/127 R, 286, 785, 198/786, 787, 789, 791, 415; 193/35 R, 35 MD, 37; 200/6 A, 628

[56] References Cited

UNITED STATES PATENTS

| | | | |
|---|---|---|---|
| 3,645,379 | 2/1972 | Kornylak | 198/127 R |
| 3,679,043 | 7/1972 | Becker | 193/35 MD |
| 3,770,915 | 11/1973 | Bennett | 200/6 A |
| 3,804,230 | 4/1974 | Krivec | 198/127 R |

*Primary Examiner*—Johnny D. Cherry
*Assistant Examiner*—Joseph E. Valenza
*Attorney, Agent, or Firm*—Sughrue, Rothwell, Mion, Zinn & Macpeak

[57] ABSTRACT

A turntable comprising a plurality of transfer roller assemblies of the type disclosed in U.S. Pat. No. 3,804,230. The transfer roller assemblies are mounted in two parallel ranks in planar array, and means are provided for controlling the direction of rotation of the cylindrical rollers and stub rollers in selected subsets of the planar array so as to impart rotary and/or translational motion to an object positioned on the array. A center pivot pad and means for selectively urging the center pivot pad upwardly against an object positioned upon the transfer rollers may be provided to provide resistance to unwanted translation by the object.

2 Claims, 8 Drawing Figures

TURNTABLE

FIELD OF THE INVENTION

This invention relates generally to turntable for rotating articles, such as boxes or pallets.

SUMMARY OF THE INVENTION

The turntable disclosed and claimed herein is an improvement on the turntable disclosed and claimed in commonly assigned U.S. application Ser. No. 612,961, filed Sept. 12, 1975. It comprises a plurality of transfer roller assemblies of the type disclosed in U.S. Pat. No. 3,804,230. The transfer roller assemblies are mounted in two parallel ranks in planar array, and means are provided for controlling the direction of rotation of the cylindrical rollers and stub rollers in selected subsets of the planar array so as to impart rotary and/or translational motion to an object positioned on the array. A center pivot pad and means for selectively urging the center pivot pad upwardly against an object positioned upon the transfer rollers may be provided to provide resistance to unwanted translation by the object.

DETAILED DESCRIPTION OF THE PREFERRED EMBODIMENTS

Turntables according to this invention employ transfer roller assemblies of the type disclosed in U.S. Pat. No. 3,804,230, and familiarity with the disclosure in that patent is presumed herein. However, one of the transfer roller assemblies will be briefly described with the aid of FIGS. 3–5 for readier understanding of this invention.

Figure 3:
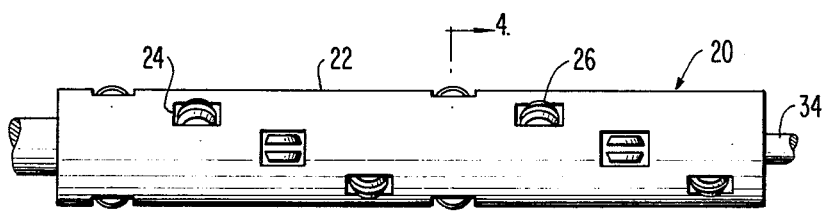
FIG. 3 is a view of a single transfer roller assembly of the type employed in turntables according to the present invention.
Figure 4:
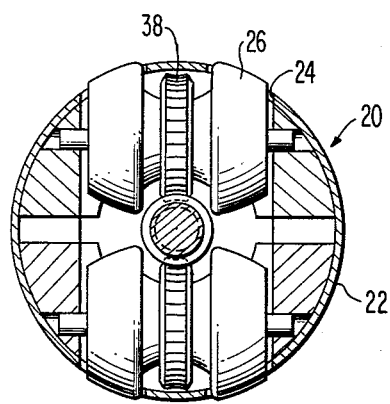
FIG. 4 is a view along the line 4—4 in FIG. 3.
Figure 5:
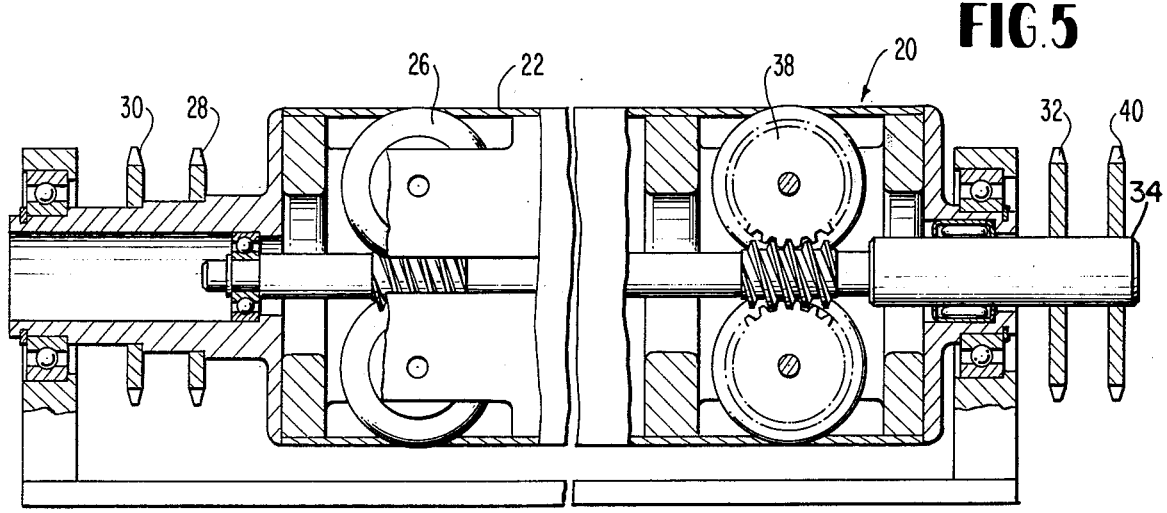
FIG. 5 is a cross-sectional view of a single transfer roller assembly of the type employed in turntables according to the present invention.

As illustrated in FIGS. 3–5, each transfer roller assembly 20 comprises a hollow cylindrical roller 22 having a plurality of spaced apertures 24 in the surface thereof and a plurality of stub rollers 26 mounted in each roller 22 such that their axes of rotation are not parallel to the axis of rotation of the roller 22 in which they are mounted and such that a portion of the surface of each of the stub rollers 26 protrudes through a corresponding one of the plurality of spaced apertures 24. As explained in more detail in the above-mentioned patent, in practice it has been found preferable to mount the stub rollers 26 in balanced pairs, the axes of which are coplanar, parallel to each other, and perpendicular to the axis of the roller 22 in which they are mounted. The roller 22 may be rotated about its axis of rotation by means of sprocket 28 (shown at the left in FIG. 5), and the rotary motion of the roller 22 may be passed on to an adjacent roller by means of sprocket 30 and an appropriate chain (not shown in FIGS. 3–5). The stub rollers 26 may be rotated about their axes of rotation by means of sprocket 32 (shown at the right in FIG. 5), shaft 34, driving worm gears 36, and driven worm gears 38, and the rotary motion of the shaft 34 (and thus of the stub rollers 26) may be passed on to an adjacent shaft by means of sprocket 40 and an appropriate chain (not shown in FIGS. 3–5).

Figure 1:
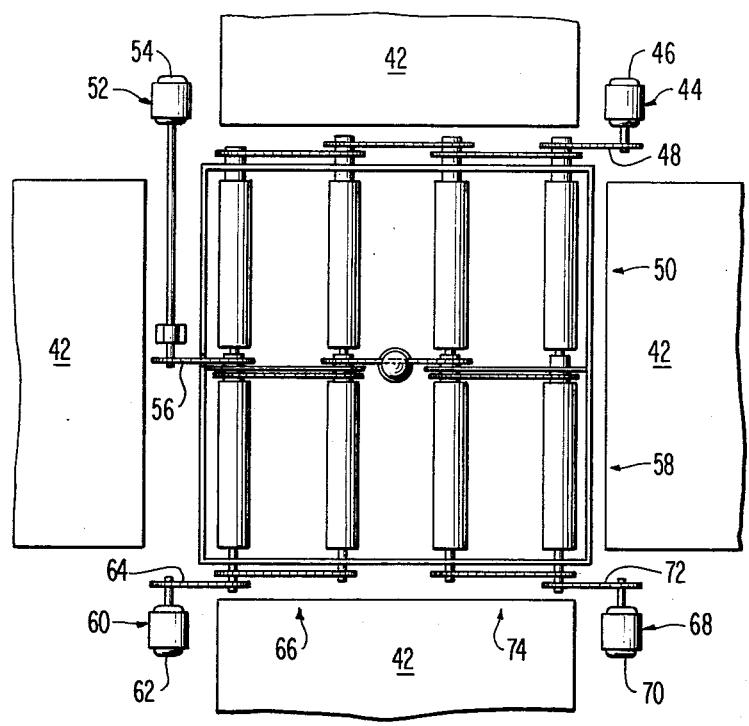
FIG. 1 is a simplified plan view of a turntable according to the present invention.

A turntable according to the present invention is shown in FIG. 1. The turntable may consist of more or less transfer roller assemblies as needed, and castered wheels or other unpowered devices may be interspersed with the transfer roller assemblies to aid in supporting objects to be rotated. Four input/output conveyors 42 are shown feeding to the turntable, and the purpose of the turntable is to accept an object, such as a box or a pallet, and translate it and/or rotate it so that it can leave the turntable on any one of the four conveyors in any desired orientation. In order to accomplish this, means 44 comprising a motor 46 and chains 48 are provided for rotating the cylindrical rollers in the upper rank 50 in a selected direction, means 52 comprising a motor 54 and chains 56 are provided for rotating the cylindrical rollers in the lower rank 58 in a selected direction, means 60 comprising a motor 62 and chains 64 are provided for rotating the stub rollers in a first file 66 of the adjacent transfer roller assemblies, and means 68 comprising a motor 70 and chains 72 are provided for rotating the stub rollers in a second file 74 of adjacent transfer roller assemblies. The intersection of each rank and file in the embodiment shown in FIG. 1 defines a quadrant containing two transfer roller assemblies.

Figure 6:
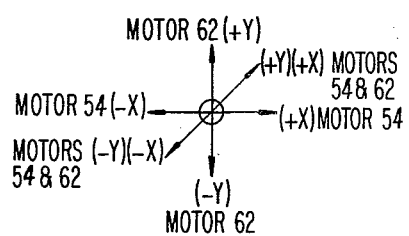
FIG. 6 is a schematic diagram used to illustrate the operation of the joystick which controls the operation of the turntable shown in FIG. 1.
Figure 6:
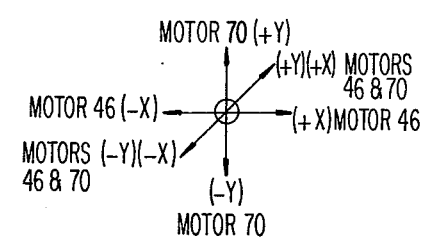

The means 44, 52, 60, and 68 are controlled by two joysticks the operation of which is illustrated in FIG. 6. Such joysticks are commercially available; for instance, we have succesfully used joysticks sold by Cutler-Hammer and having the part no. 10250T451. They are factory assemblied with a gate arranged for four handle positions, and three additional gates, allowing two, three, and eight handle positions, are included in the package. However, we modify the joysticks as they come from the factory to create two six position joysticks. As shown in FIG. 6, the left-hand joystick is connected to the motors 54 and 62, and the right-hand joystick is connected to the motors 46 and 70. When the joysticks are in their central positions, none of the motors are engaged, and neither the cylindrical rollers nor the stub rollers rotate. When each of the joysticks is moved to one of the handle positions shown, the indicated motor or motors causes the rollers to which it is connected to rotate in the indicated direction, and by selecting appropriate handle positions, an object positioned on the turntable can be caused to translate and-/or rotate. For instance, if both joysticks in FIG. 6 are moved to their right handle position, an object on the turntable will move from left to right on the turntable, while if the lefthand joystick is moved to the upper right position and the right-hand joystick is moved to the lower left position, an object on the turntable will rotate in the clockwise direction.

It will be immediately apparent that, if the geometric and/or mass center of an object to be rotated is not perfectly centered on the turntable when a rotation is begun, the object will have a tendency to drift, the direction of the drift depending on the location of the geometric and mass centers of the object. However, this tendency can be countered in either or both of two ways.

First, the joysticks can be used to counter the tendency to drift. If, for instance, an object on the turntable starts to drift upwards in FIG. 6 while being rotated in the clockwise direction, the left-hand joystick can be moved from the upper position to the lower position, causing the object to move downwardly in FIG. 6 to the x-axis, and then one or both joysticks can be moved to the right-hand position to cause the object to move towards the y-axis when the operator estimates that the object has moved to a desired position with respect to the x-axis.

Figure 2:
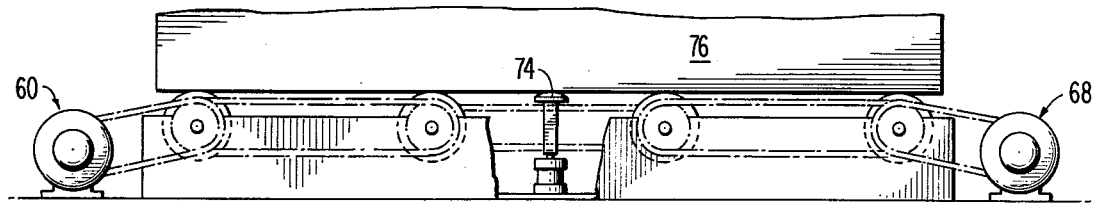
FIG. 2 is a simplified side view of the turntable shown in FIG. 1 with a portion broken away to show the center pivot pad.

Second, a center pivot pad 74, best seen in FIG. 2, can be used to provide resistance to unwanted translation of an object, such as object 76 in FIG. 2, while allowing it to rotate about the pivot pad with relative freedom. The pivot pad 74, which is preferably freely rotatable about a vertical axis, is located centrally of the plurality of transfer roller assemblies. The pivot pad 74 is normally retained beneath the surface of the transfer roller assemblies, but means, such as they hydraulic cylinder 78 shown in FIG. 2, are provided for selectively urging the pivot pad 74 upwardly against an object positioned on the turntable to act as a pivot pin. Of course, the force with which the pivot pad 74 is forced against an object to be rotated to provide a pivot point must be balanced against the contact force required to rotate the object, and the pivot pad approach cannot be used if the object is too far off center.

Of course, the utility of the pivot pad 74 is not limited to the multi-quadrant turntable disclosed herein, and such a pivot pad is shown in a simple turntable of the type disclosed in commonly assigned U.S. Pat. application Ser. No. 612,961, filed Sept. 12, 1975. It should be pointed out that, in such configurations, the desired position for an object to be rotated is not necessarily on the x-axis, and indeed a plurality of pivot pads could be provided at spaced intervals along the y-axis, to give the operator of the turntable his choice of pivot points.

Figure 7:
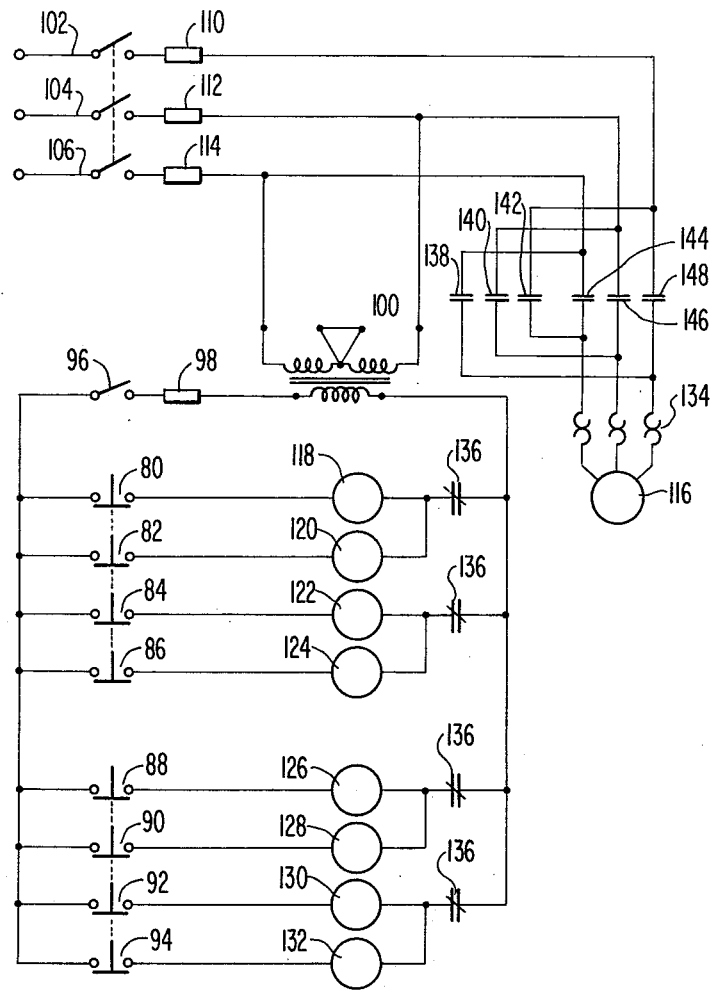
FIG. 7 is a schematic diagram of the control means for the turntable shown in FIG. 1.
Figure 8:
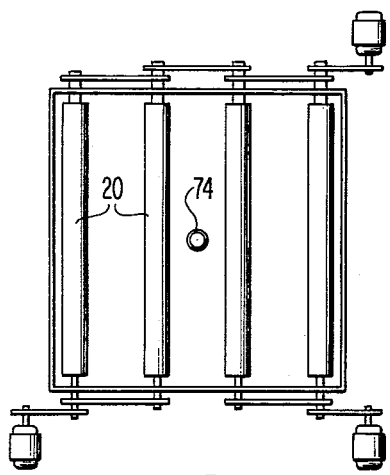
FIG. 8 is a simplified plan view of a turntable according to the present invention employing a single rank of transfer roller assemblies, and a center pivot pad.

FIG. 7 shows the wiring of the control means for the turntable shown in FIG. 1. Switch 80 is connected to the +y position for the left-hand joystick (i.e., to both the upper and the upper right positions in FIG. 6), switch 82 is connected to the −y position for the left-hand joystick (i.e., to both the lower and the lower left positions in FIG. 6), switch 84 is connected to the +x position for the left-hand joystick (i.e., to both the right and the upper right positions in FIG. 6), etc., each of these switches being spring-biased to center position, as shown. Switch 98 is the control power switch, and fuse 98 is a circuit protection fuse for the control circuit. Power is provided to the control circuit via the transformer 100 connected to two of the three-phase power lines 102, 104, and 106. A manual switch 108 and motor protector fuses 110, 112, and 114 are provided in the power lines. The reversing motor 116 shown is a "typical" motor - that is, it could be motor 46, motor 64, motor 62, or motor 70. Motor control relays 118-132 are connected to the switches 80-94, respectively. Each pair of motor control relays (i.e., motor control relays 118 and 120, motor control relays 122 and 124, motor control relays 126 and 128, and motor control relays 130 and 132) is connected to a reversing motor, such as the reversing motor 116 shown, via overload protective devices 134 which include the elements 136. Thus, when one of the switches 80-94 is closed, the associated motor control relay causes the appropriate ones of the contacts such as contacts 138, 140, 142, 144, 146, and 148 to close. For instance, if the reversing motor 116 is associated with the motor control relays 118 and 120 and the switch 80 is closed, the contacts 138, 140, and 142 are caused to close, while if the switch 82 is closed, the contacts 144, 146, and 148 are closed. Since each motor control relays is associated with only a single switch, no interlocking means has to be provided to prevent inconsistent commands from being given simultaneously to the same rollers. However, it may be desirable to provide interlocking means to prevent inconsistent commands from being given simultaneously to different rollers - as, for instance, a command putting both the left- and the right-hand joysticks in their upper right positions if there is no take-off means provided at the upper right corner of the turntable.

The illustrated joysticks are simple on/off devices. That is, when one of the switches 80 etc. is closed, the associated reversing motor is simply turned on and builds to a preset speed as rapidly as the load on it permits. For most applications, that configuration is entirely adequate, the inertia of the system being sufficient to prevent hazardous accelerations and decelerations. However, for some applications it may be desirable to provide more sophisticated joysticks in which the speed of rotation is variable and controlled continuously by the position of the joystick.

Similarly, the embodiment illustrated in FIGS. 1, 6 and 7 is designed for manual control, but it would obviously be a simple matter to automate the control if either the speed of the turntable or the environment in which it was to be used precluded manual control.

Caveat

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A turntable comprising:
   a. a plurality of transfer roller assemblies mounted in planar array, each of said transfer roller assemblies comprising:
      i. a hollow cylindrical roller having a plurality of spaced apertures in the surface thereof and
      ii. a plurality of stub rollers mounted in said hollow cylindrical roller such that their axes of rotation are not parallel to the axis of rotation of said hollow cylindrical roller and a portion of the surface of each of said stub rollers protrudes through a corresponding one of said plurality of spaced apertures in said hollow cylindrical roller;
   b. first means for rotating said hollow cylindrical rollers in a first subset of adjacent ones of said transfer roller assemblies in a selected direction;
   c. scond means for rotating said hollow cylindrical rollers in a second subset of adjacent ones of said transfer roller assemblies in a selected direction, said second subset being axially aligned with the first subset;
d. third means for rotating said stub rollers in said first subset of said transfer roller assemblies in a selected direction;
e. fourth means for rotating said stub rollers in said second subset of said transfer roller assemblies in a selected direction;
f. fifth means for rotating said hollow cylindrical roller in a third subset of adjacent ones of said transfer roller assemblies in a selected direction;
g. sixth means for rotating said hollow cylindrical rollers in a fourth subset of adjacent ones of said transfer roller assemblies in a selected direction, said fourth subset being axially aligned with the third subset;
h. seventh means for rotating said stub rollers in said third subset of said transfer roller assemblies in a selected direction;
i. eighth means for rotating said stub rollers in said fourth subset of said transfer roller assemblies in a selected direction; and
j. ninth means for controlling said first, second, third, fourth, fifth, sixth, seventh, and eighth means so that the directions in which said third and fourth means cause the stub rollers in said first and second subsets of said transfer roller assemblies to rotate are independent of the directions in which said seventh and eighth means cause the stub rollers in said third and fourth subsets of said transfer roller assemblies to rotate and so that an object positioned upon said plurality of transfer roller assemblies can be caused to rotate and/or translate with respect to said plurality of transfer roller assemblies.

2. A turntable as claimed in claim 1 and further comprising:
a. a center pivot pad located centrally of said plurality of transfer roller assemblies and
b. tenth means for selectively urging said center pivot pad upwardly against an object positioned upon said plurality of transfer roller assemblies, thereby providing resistance to unwanted translation by the object but allowing it to rotate about said center pivot pad with relative freedom.

* * * * *